(12) United States Patent
Tawarada et al.

(10) Patent No.: US 9,091,326 B2
(45) Date of Patent: Jul. 28, 2015

(54) AIR BLEEDING VALVE FOR HYDRAULIC TENSIONER OF AN ENGINE AND HYDRAULIC TENSIONER INCORPORATING SAME

(75) Inventors: Yuichi Tawarada, Saitama (JP);
Yoshiaki Tsukada, Saitama (JP);
Osamu Emizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 416 days.

(21) Appl. No.: 13/425,482

(22) Filed: Mar. 21, 2012

(65) Prior Publication Data

US 2012/0252616 A1 Oct. 4, 2012

(30) Foreign Application Priority Data

Mar. 31, 2011 (JP) ................................. 2011-077425

(51) Int. Cl.
*F16H 7/08* (2006.01)
*F15B 21/04* (2006.01)

(52) U.S. Cl.
CPC ............ *F16H 7/0848* (2013.01); *F15B 21/044* (2013.01); *F16H 2007/0806* (2013.01); *F16H 2007/0814* (2013.01); *F16H 2007/0817* (2013.01); *F16H 2007/0859* (2013.01)

(58) Field of Classification Search
CPC .......... F16H 7/0836; F16H 2007/0814; F16H 2007/0817; F15B 21/044
USPC ......................... 474/109, 110, 111; 137/514.5
See application file for complete search history.

(56) References Cited

U.S. PATENT DOCUMENTS

| 4,881,927 | A | * | 11/1989 | Suzuki ........................ 474/110 |
| 5,707,309 | A | * | 1/1998 | Simpson ...................... 474/110 |
| 6,383,103 | B1 | * | 5/2002 | Fujimoto et al. ............. 474/110 |
| 6,810,907 | B2 | * | 11/2004 | Hashimoto et al. ........ 137/514.5 |
| 7,070,528 | B2 | * | 7/2006 | Emizu et al. .................. 474/110 |
| 7,223,190 | B2 | * | 5/2007 | Yoshida ........................ 474/110 |

(Continued)

FOREIGN PATENT DOCUMENTS

| JP | S61294250 A | 12/1986 |
| JP | H08-303535 A | 11/1996 |
| JP | H08303535 A | 11/1996 |

(Continued)

OTHER PUBLICATIONS

JP08303535 English Translation.pdf.*

*Primary Examiner* — Michael Mansen
*Assistant Examiner* — Minh Truong
(74) *Attorney, Agent, or Firm* — Carrier Blackman & Associates, P.C.; Joseph P. Carrier; Jeffrey T. Gedeon

(57) ABSTRACT

An air bleeding valve includes an annular valve element for removing air from oil contained in a hydraulic circuit of a hydraulic tensioner and for suppressing the removal of the oil. An air bleeding valve body is fitted in an air bleeding valve accommodating hole formed in the hydraulic tensioner. A circumferential groove having a rectangular cross section is formed on an outer circumferential surface of the air bleeding valve body. The annular valve element having a rectangular cross section is fitted in the circumferential groove so as to be movable in an axial direction parallel to the axis of the annular valve element, and displaceable in a radial direction toward and away from the axis of the annular valve element. Such air bleeding valve removes air in a hydraulic circuit while suppressing the removal of oil in the hydraulic circuit during starting operation of an engine.

20 Claims, 15 Drawing Sheets

(56) References Cited

U.S. PATENT DOCUMENTS

| | | | |
|---|---|---|---|
| 7,427,250 B2 * | 9/2008 | Yoshida | 474/110 |
| 8,137,224 B2 | 3/2012 | Emizu et al. | |
| 2008/0280712 A1 * | 11/2008 | Ryouno et al. | 474/110 |
| 2009/0197722 A1 * | 8/2009 | Emizu et al. | 474/110 |

FOREIGN PATENT DOCUMENTS

| | | |
|---|---|---|
| JP | H10-184825 A | 7/1998 |
| JP | H10184825 A | 7/1998 |
| JP | 4017427 B | 12/2007 |
| JP | 2009180358 A | 8/2009 |

* cited by examiner

AIR BLEEDING VALVE FOR HYDRAULIC TENSIONER OF AN ENGINE AND HYDRAULIC TENSIONER INCORPORATING SAME

CROSS-REFERENCE TO RELATED APPLICATIONS

The present invention claims priority under 35 USC 119 based on Japanese patent application No. 2011-077425, filed on Mar. 31, 2011. The entire subject matter of this priority document, including specification claims and drawings thereof, is incorporated by reference herein.

BACKGROUND OF THE INVENTION

1. Field of the Invention

The present invention relates to an air bleeding valve for a hydraulic tensioner of an internal combustion engine for applying a proper tension to an endless transmitting member such as an endless chain and an endless belt of power transmission in a valve train for the engine. More particularly, the present invention relates to an air bleeding valve which selectively removes air and suppresses removal of oil in a hydraulic circuit of the hydraulic tensioner, and to a hydraulic tensioner incorporating the same.

2. Description of the Background Art

An internal combustion engine mounted on a vehicle such as a motorcycle is provided with a hydraulic tensioner for pushing an endless transmitting member for driving a camshaft in a valve train, so as to prevent fluttering of the endless transmitting member during the operation of the engine.

When the operation of the engine is stopped to cause the entry of air into a hydraulic circuit of the hydraulic tensioner, there is a possibility that the hydraulic tensioner may not operate smoothly. In order to eliminate such a problem, a hydraulic tensioner having an air bleeding valve using a spherical valve element for removing the air in the hydraulic circuit in hydraulic tensioner has been proposed. An example of such hydraulic tensioner is disclosed in the Japanese Patent Document Japanese Patent No. 4017427.

In the hydraulic tensioner having the air bleeding valve in the hydraulic circuit, such as described in the Japanese Patent Document Japanese Patent No. 4017427, the spherical valve element is used in the air bleeding valve. Accordingly, when the volume of a valve chamber is increased to remove a large amount of air in a short period of time, the spherical valve element in the valve chamber is unstably moved in the valve chamber to incur vibrations, causing the turbulence of air to be removed. Further, the amount of air to be removed cannot be increased against expectation.

Further, oil from the hydraulic circuit is also removed during the removal of air, so that the load on a hydraulic pump is not reduced, resulting in poor fuel economy.

The present invention is an improvement over the existing air bleeding valve for the hydraulic tensioner that overcomes the above problems. Accordingly, it is one of the objects of the present invention to provide an air bleeding valve which can selectively remove air in a hydraulic circuit while suppressing the removal of oil in the hydraulic circuit in the initial stage of a starting operation of an internal combustion engine, and which can remove the air efficiently in a short period of time.

SUMMARY OF THE INVENTION

In order to achieve the above objects, the present invention according to a first aspect thereof provides an air bleeding valve for a hydraulic tensioner having a valve element for removing air from oil contained in a hydraulic circuit of the hydraulic tensioner and for suppressing the removal of the oil, characterized in that an air bleeding valve body is fitted in an air bleeding valve accommodating hole of the hydraulic tensioner; a circumferential groove having a rectangular cross section is formed on the outer circumferential surface of the air bleeding valve body; and the valve element includes an annular valve element having a rectangular cross section fitted in the circumferential groove so as to be movable in an axial direction parallel to the axis of the annular valve element and displaceable in a radial direction toward and away from the axis of the annular valve element.

The present invention according to a second aspect thereof, in addition to the first aspect, is characterized in that when an oil pressure is applied to the annular valve element, one end surface of the annular valve element comes into close contact with one side surface of the circumferential groove having a rectangular cross section.

The present invention according to a third aspect thereof, in addition to one of the first and second aspects, is characterized in that the annular valve element is formed with a cut portion for allowing elastic deformation of the annular valve element in the radial direction.

The present invention according to a fourth aspect thereof, in addition to the third aspect, is characterized in that the cut portion of the annular valve element includes a pair of first cut portions extending axially from the opposite end surfaces of the annular valve element at circumferentially spaced positions to the axially middle position between the opposite end surfaces of the annular valve element and a second cut portion extending circumferentially parallel to the opposite end surfaces of the annular valve element so as to connect the axially inner ends of the first cut portions.

The present invention according to a fifth aspect thereof, in addition to the third aspect, is characterized in that the cut portion of the annular valve element includes an inclined cut surface extending from one end surface to the other end surface of the annular valve element so as to be inclined with respect to the axis of the annular valve element.

The present invention according to a sixth aspect thereof, in addition to one of the first through fifth aspects, is characterized in that the air bleeding valve body is slidably fitted in the air bleeding valve accommodating hole of the hydraulic tensioner.

The present invention according to a seventh aspect thereof, in addition to the sixth aspect, is characterized in that the air bleeding valve body includes an upstream valve body and a downstream valve body; the upstream valve body is slidably inserted in the air bleeding valve accommodating hole of the hydraulic tensioner; the downstream valve body is fixedly mounted in the air bleeding valve accommodating hole such that a spacing is defined between the downstream end surface of the upstream valve body and the upstream end surface of the downstream valve body; and a spring is interposed between the upstream valve body and the downstream valve body for biasing the upstream valve body toward the upstream side.

The present invention according to a eighth aspect thereof, in addition the seventh aspect, is characterized in that at least a portion of the spring is fitted in an air bleeding hole formed in the downstream valve body, and the spring includes a coil spring.

The present invention according to a ninth aspect thereof, in addition to one of the first through fifth aspects, is characterized in that the air bleeding valve body is fixedly fitted in the air bleeding valve accommodating hole of the hydraulic tensioner.

The present invention according to a tenth aspect thereof, in addition to one of the first through ninth aspects, is characterized in that the air bleeding valve body is formed with a central hole located upstream of the circumferential groove and extending axially from the center of the end surface toward the downstream side and a plurality of radial holes extending radially from the downstream end of the central hole and equally spaced in the circumferential direction.

The present invention according to an eleventh aspect thereof, in addition to one of the first through tenth aspects, is characterized in that the air bleeding valve body is formed with an air bleeding hole located downstream of the circumferential groove and extending axially so as to communicate with the outside of a tensioner body of the hydraulic tensioner and an air bleeding passage extending radially from the outer circumference of the air bleeding valve body to the air bleeding hole.

The present invention according to a twelfth aspect thereof, in addition to one of the first through eleventh aspects, is characterized in that when the hydraulic tensioner is mounted on an internal combustion engine, the upper end of the air bleeding valve accommodating hole is higher in level than a plunger accommodating hole for accommodating a plunger and a pressure holding valve accommodating hole for accommodating a pressure holding valve.

Effects of the Invention

According to the air bleeding valve for the hydraulic tensioner as defined in the first aspect, the air in a mixture of air and oil is easily passed through the gap between the inner surface (the side surfaces and bottom surface) of the circumferential groove having a rectangular cross section and the side surface (the end surfaces and inner circumferential surface) of the annular valve element having a rectangular cross section because the air has low viscosity, thereby removing the air from the hydraulic circuit. However, the oil having high viscosity is not allowed to pass through this gap, thereby suppressing the removal of oil from the hydraulic circuit. Accordingly, the air can be efficiently and selectively removed from the oil in the hydraulic circuit, thereby maintaining the function of the hydraulic tensioner at a high level.

The annular valve element having a rectangular cross section is fitted in the circumferential groove having a rectangular cross section. Accordingly, the annular valve element can be held stably in the circumferential groove, thereby suppressing the vibrations of the annular valve element.

According to the air bleeding valve for the hydraulic tensioner as defined in the second aspect, the annular valve element having a rectangular cross section is brought into close contact with the circumferential groove having a rectangular cross section by the oil pressure in the operational condition of the hydraulic tensioner, thereby suppressing the removal of the oil. At the same time, the removal of the air can be smoothly performed. Thus, the amount of air to be removed can be increased with a high level of oil sealability being maintained.

According to the air bleeding valve for the hydraulic tensioner as defined in the third aspect, the annular valve element having elasticity can be easily fitted into the circumferential groove of the air bleeding valve body without damage. Further, the outer circumferential surface of the annular valve element can be brought into close contact with the inner circumferential surface of the air bleeding valve accommodating hole by the elasticity of the annular valve element, thereby further suppressing the removal of oil and ensuring the sealability.

According to the air bleeding valve for the hydraulic tensioner as defined in the fourth aspect, even when the diameter of the annular valve element is increased so that the outer circumferential surface of the annular valve element comes into close contact with the inner circumferential surface of the air bleeding valve accommodating hole of the hydraulic tensioner, the facing cut surfaces forming the second cut portion extending in the circumferential direction of the annular valve element are kept in close contact with each other, thereby eliminating the leakage of oil.

According to the air bleeding valve for the hydraulic tensioner as defined in the fifth aspect, even when the diameter of the annular valve element is increased so that the outer circumferential surface of the annular valve element comes into close contact with the inner circumferential surface of the air bleeding valve accommodating hole of the hydraulic tensioner, the facing cut surfaces forming the inclined cut surface of the annular valve element are kept in close contact with each other, thereby eliminating the leakage of oil.

According to the air bleeding valve for the hydraulic tensioner as defined in the sixth aspect, the air bleeding valve body is slidably fitted in the air bleeding valve accommodating hole. Accordingly, the annular valve element having a rectangular cross section is axially slid by the sliding operation of the air bleeding valve body, so that foreign matter sticking to the inner circumferential surface of the air bleeding valve accommodating hole can be scraped off by the sliding motion of the annular valve element.

According to the air bleeding valve for the hydraulic tensioner as defined in the seventh aspect, the air bleeding valve body is reciprocatably slid in the air bleeding valve accommodating hole of the hydraulic tensioner, thereby scraping off the foreign matter sticking to the inner circumferential surface of the air bleeding valve accommodating hole.

According to the air bleeding valve for the hydraulic tensioner as defined in the eighth aspect, the channel resistance of the air bleeding hole in the downstream valve body can be increased by the coil spring, thereby further suppressing the leakage of oil.

According to the air bleeding valve for the hydraulic tensioner as defined in the ninth aspect, any lid member for preventing the air bleeding valve body from falling out of the air bleeding valve accommodating hole of the hydraulic tensioner is not necessary, thereby simplifying the structure and attaining a cost reduction.

According to the air bleeding valve for the hydraulic tensioner as defined in the tenth aspect, a mixture of air and oil introduced into the central hole from the oil introducing side toward the oil exiting side of the air bleeding valve body can be equally dispersed through the plural radial holes to the inner circumferential surface of the air bleeding valve accommodating hole of the air tensioner.

As a result, the mixture of air and oil can be uniformly dispersed to the entire circumference of the gap formed between the inner circumferential surface of the air bleeding valve accommodating hole of the air tensioner and the outer circumferential surface of the air bleeding valve body, so that only the air can be uniformly removed without radial vibrations of the air bleeding valve body.

According to the air bleeding valve for the hydraulic tensioner as defined in the eleventh aspect, the mixture of air and small amount of oil possibly passed through the circumferential groove of the air bleeding valve body flows through a downstream passage having a large channel resistance, so that the leakage of oil can be reduced.

According to the air bleeding valve for the hydraulic tensioner as defined in the twelfth aspect, the upper end of the air bleeding valve accommodating hole is higher in level than the plunger accommodating hole and the pressure holding valve accommodating hole, so that air in the plunger and the pressure holding valve can be smoothly removed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Illustrative embodiments of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Describe below is an air bleeding valve 30 provided in a hydraulic tensioner 0 according to an illustrative embodiment of the present invention with reference to FIGS. 1 to 15.

Figure 1:
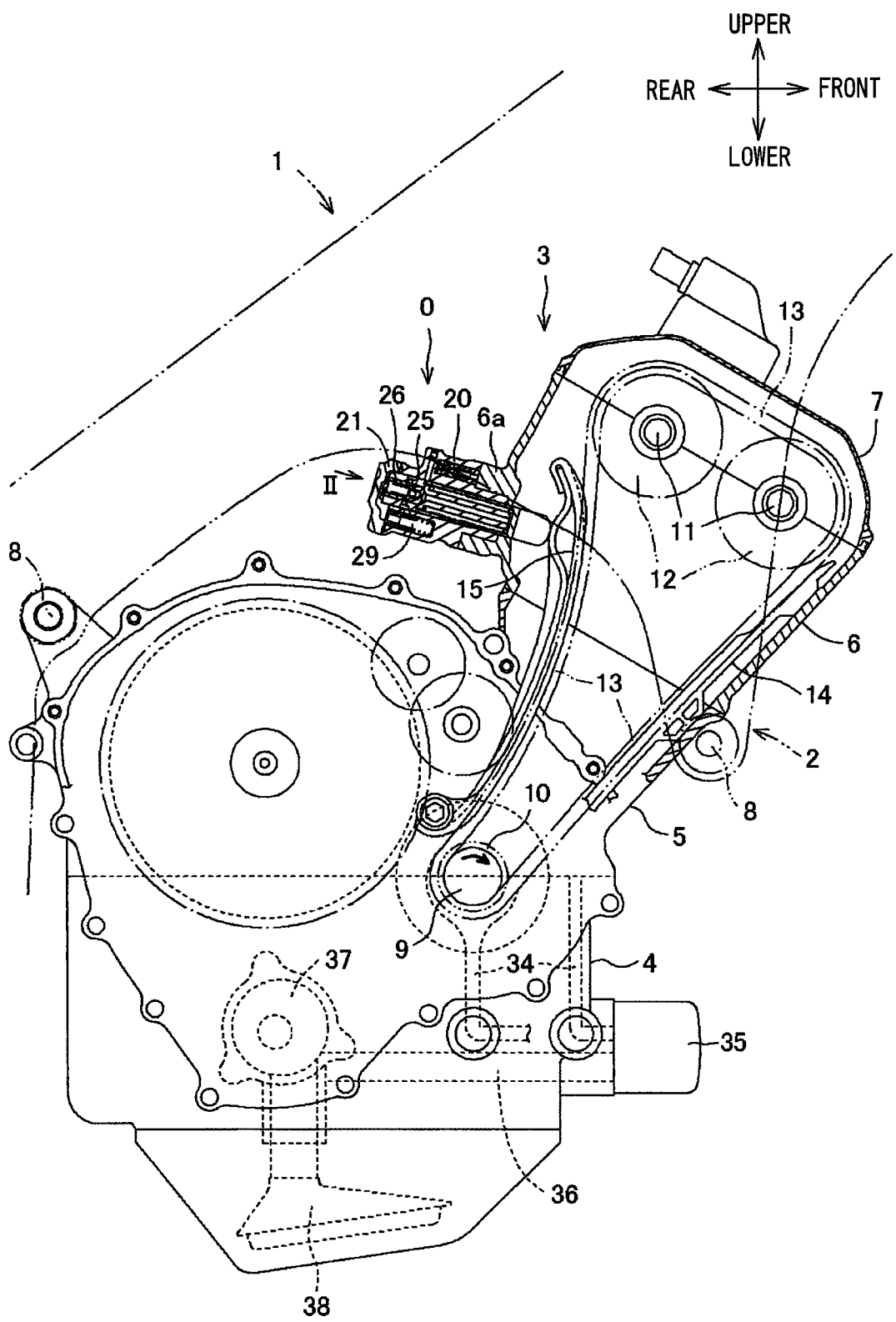
FIG. 1 shows a condition where a hydraulic tensioner having an air bleeding valve according to an illustrative embodiment of the present invention is applied to a timing chain constituting a transmitting mechanism of a valve train in a four-stroke cycle DOHC internal combustion engine mounted on a motorcycle.

FIG. 1 is a right side view of an essential part showing a condition where an internal combustion engine 3 having the hydraulic tensioner 0 is mounted on a body frame 1 of a motorcycle (or a road vehicle such as an automobile).

In the following description, the terms of front, rear, upper, lower, right, and left mean the directions with respect to the running direction of the vehicle. In FIG. 1, the front and rear sides of the vehicle are the same as the right and left sides of the drawing, respectively, the upper and lower sides of the vehicle are the same as the upper and lower sides of the drawing, respectively, and the right and left sides of the vehicle are the same as the front and back sides of the sheet of the drawing, respectively.

As shown in FIG. 1, the internal combustion engine 3 of a four-stroke cycle DOHC type has the hydraulic tensioner 0. The engine 3 is mounted on a motorcycle. More specifically, the front portion of the body frame 1 of the motorcycle is provided with a hanger 2, and the engine 3 is provided with two projecting bosses 8. The engine 3 is mounted through the bosses 8 to the hanger 2 and the rear portion of the body frame 1.

The engine 3 has a crankcase 4, a cylinder block 5 mounted on the upper end of the crankcase 4, a cylinder head 6 mounted on the upper end of the cylinder block 5, and a head cover 7 mounted on the upper end of the cylinder head 6. The crankcase 4, the cylinder block 5, the cylinder head 6, and the head cover 7 are joined together by a suitable joining means such as bolts (not shown).

A crankshaft 9 is rotatably supported between the crankcase 4 and the cylinder block 5. A drive sprocket 10 is fixedly mounted on the crankshaft 9. A pair of camshafts 11 is rotatably supported to the cylinder head 6, and a pair of driven sprockets 12 is fixedly mounted on the pair of camshafts 11, respectively, in the cylinder head 6 and the head cover 7. An endless timing chain 13 is wrapped among the drive sprocket 10 and the two driven sprockets 12.

The cylinder block 5 is formed with a plurality of cylinder holes (not shown), and a piston (not shown) is vertically slidably fitted in each cylinder hole. The crankshaft 9 is rotatably driven in the clockwise direction as viewed in FIG. 1 by the reciprocating motion of each piston. Torque of the crankshaft 9 is transmitted through the drive sprocket 10, the endless timing chain 13, and the two driven sprockets 12 to the two camshafts 11, thereby driving intake and exhaust valves (not shown) to open and close these valves.

The plural cylinder holes formed in the cylinder block 5 of the engine 3 are arranged in the lateral direction of the vehicle. In each cylinder hole, fuel in a combustion chamber is burned once every two revolutions of the crankshaft 9, and each piston is intermittently pushed toward the crankshaft 9 by the pressure of a combustion gas. Further, a running resistance changes due to the unevenness on a road surface during running of the motorcycle. As a result, the tension of the endless timing chain 13 varies to easily cause fluttering of the endless timing chain 13 in the longitudinal direction of the vehicle.

In order to prevent such problem, a chain guide 14 is provided so as to come into contact with a front portion of the endless timing chain 13 on the tension side, i.e., on the right side as viewed in FIG. 1. Further, a tensioner slipper 15 is provided so as to come into contact with a rear portion of the endless timing chain 13 on the slack side, i.e., on the left side as viewed in FIG. 1. Further, the hydraulic tensioner 0 is mounted on the cylinder head 6 at a position on the rear side of the tensioner slipper 15 so as to be disposed adjacent to the tensioner slipper 15.

The hydraulic tensioner 0 has a specific structure and characteristics to be hereinafter described in detail. Owing to the excellent characteristics of the hydraulic tensioner 0, the fluttering of the rear portion of the endless timing chain 13 on the slack side can be efficiently suppressed.

Figure 2:
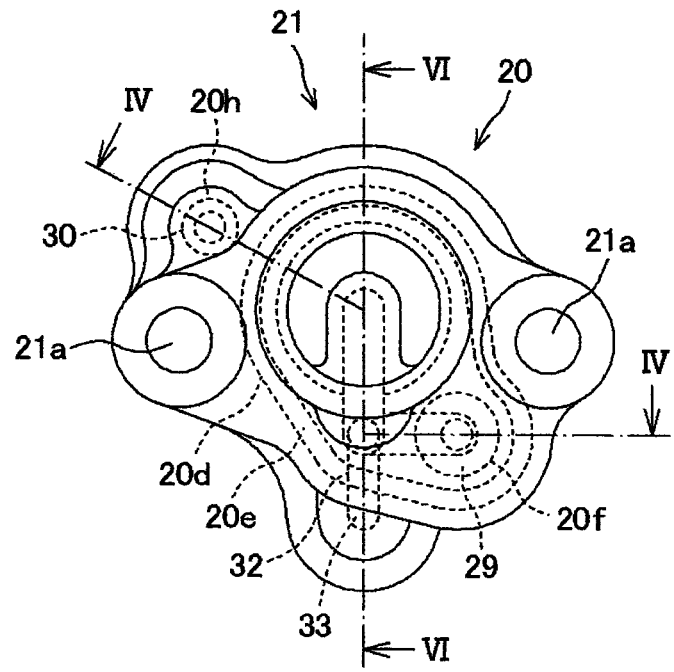
FIG. 2 shows a cap constituting the hydraulic tensioner as viewed in the direction of the arrow II in FIG. 1.
Figure 3:
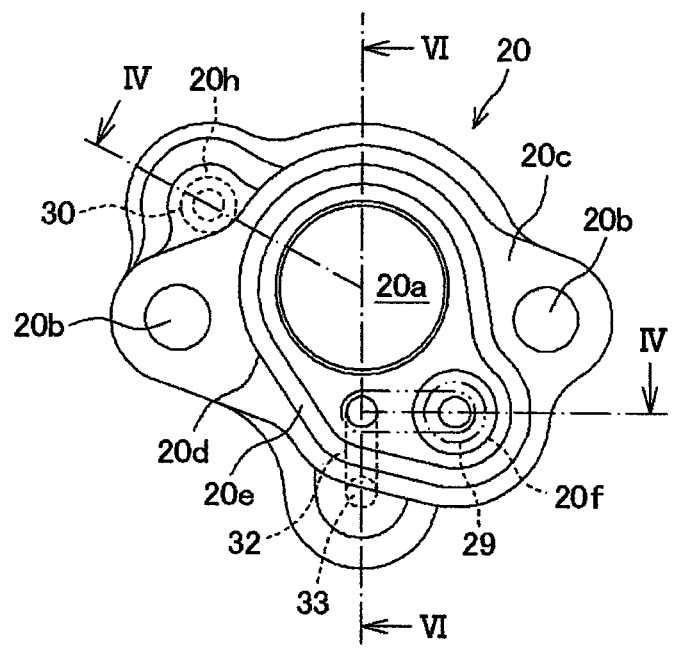
FIG. 3 is a rear view of a tensioner body constituting the hydraulic tensioner as viewed in the direction of the arrow II in FIG. 1.

The hydraulic tensioner 0 shown in FIG. 1 has a housing including a tensioner body 20 and a cap 21. As shown in FIG. 2, which is a rear view of the cap 21 as viewed in the direction of the arrow II in FIG. 1, the cap 21 is formed with a pair of right and left bolt insertion holes 21a. Further, as shown in FIG. 3, which is a rear view of the tensioner body 20 as viewed in the direction of the arrow II in FIG. 1, the tensioner body 20 is formed with a pair of right and left bolt insertion holes 20b respectively aligned to the right and left bolt insertion holes 21a of the cap 21. Two bolts (not shown) are inserted through the two bolt insertion holes 21a of the cap 21 and the two bolt insertion holes 20b of the tensioner body 20 and threadedly engaged with a tensioner mounting portion 6a formed at the rear portion of the cylinder head 6. Thus, the hydraulic tensioner 0 is fixedly mounted on the cylinder head 6.

Figure 4:
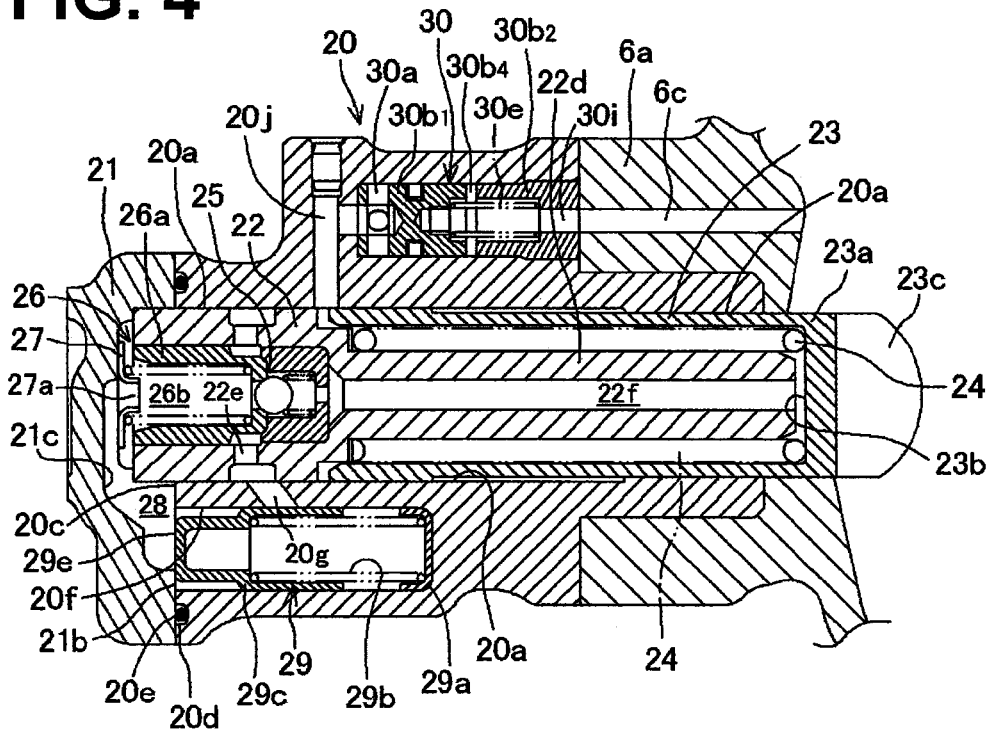
FIG. 4 is a longitudinal sectional view taken along the line IV-IV in FIG. 2.
Figure 5:
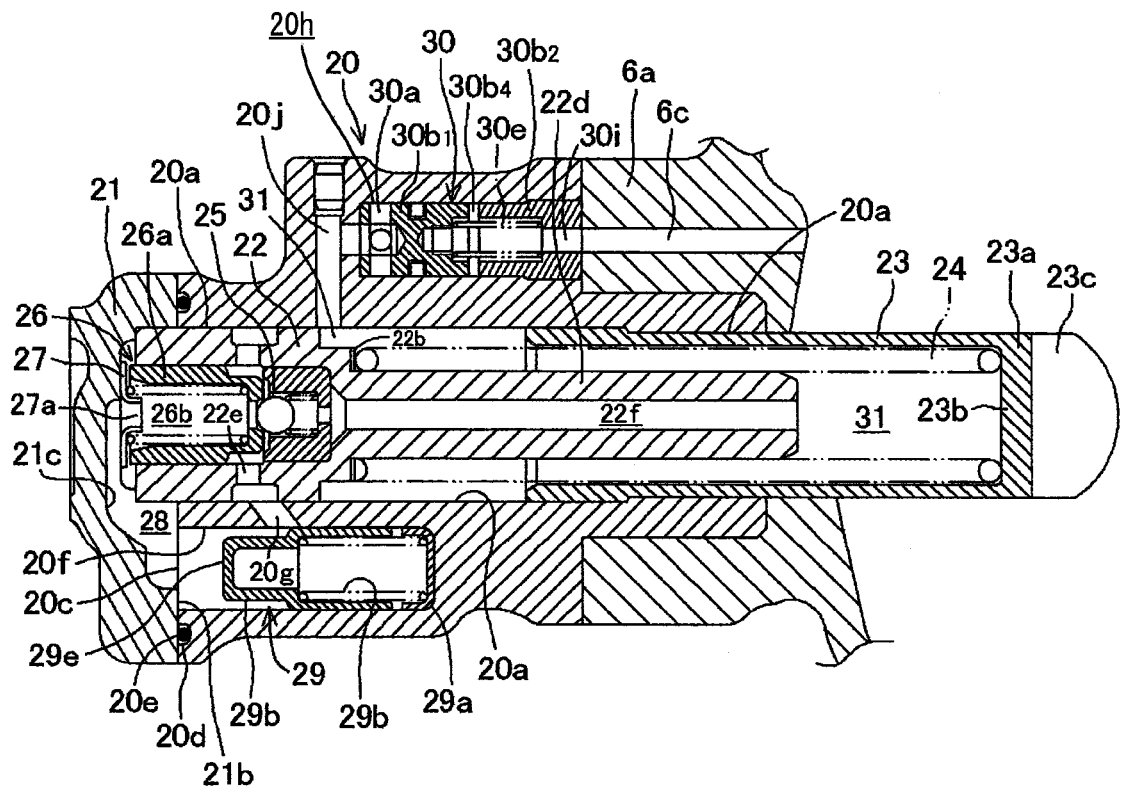
FIG. 5 is a longitudinal sectional view similar to FIG. 4, showing a condition where a plunger projects frontward from a tensioner body and a tensioner mounting portion of a cylinder head.
Figure 6:
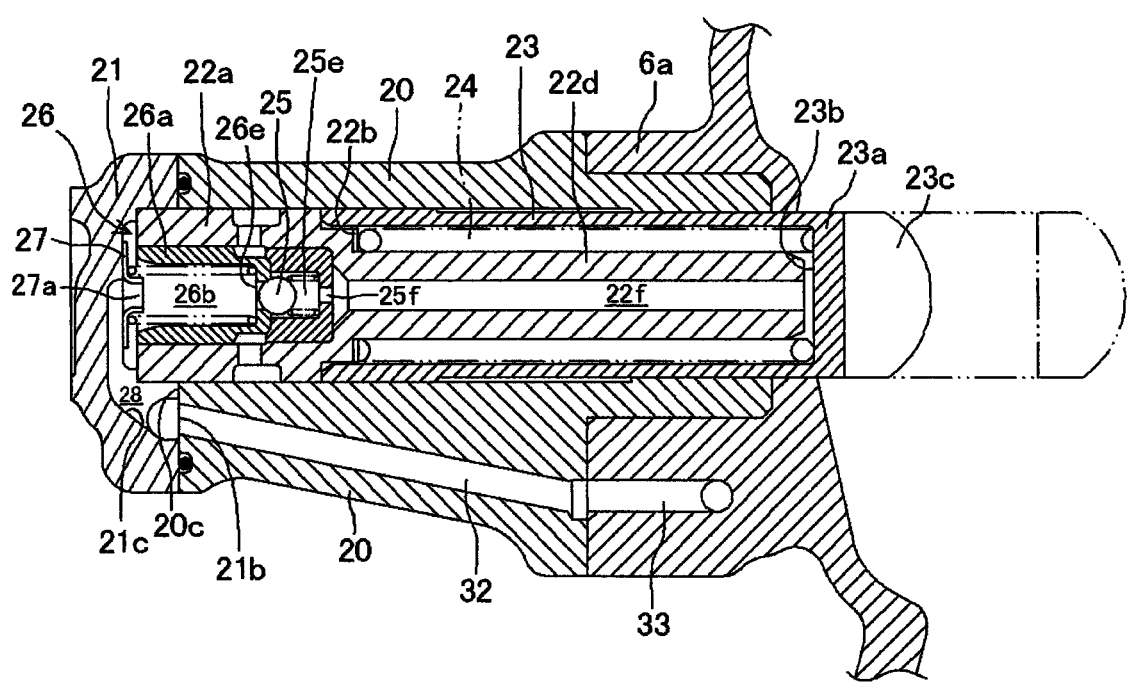
FIG. 6 is a longitudinal sectional view of the hydraulic tensioner taken along the line VI-VI in FIG. 2.

As shown in FIG. 3, a packing fitting groove 20d is formed on the rear end surface 20c of the tensioner body 20 so as to surround a plunger accommodating hole 20a, and an endless packing 20e is fitted in the packing fitting groove 20d. As shown in FIGS. 4 to 6, a recess 21c is formed on the front end surface 21b of the cap 21, and an oil storing chamber 28 is defined by the recess 21c of the cap 21 and the rear end surface 20c of the tensioner body 20.

Figure 7:
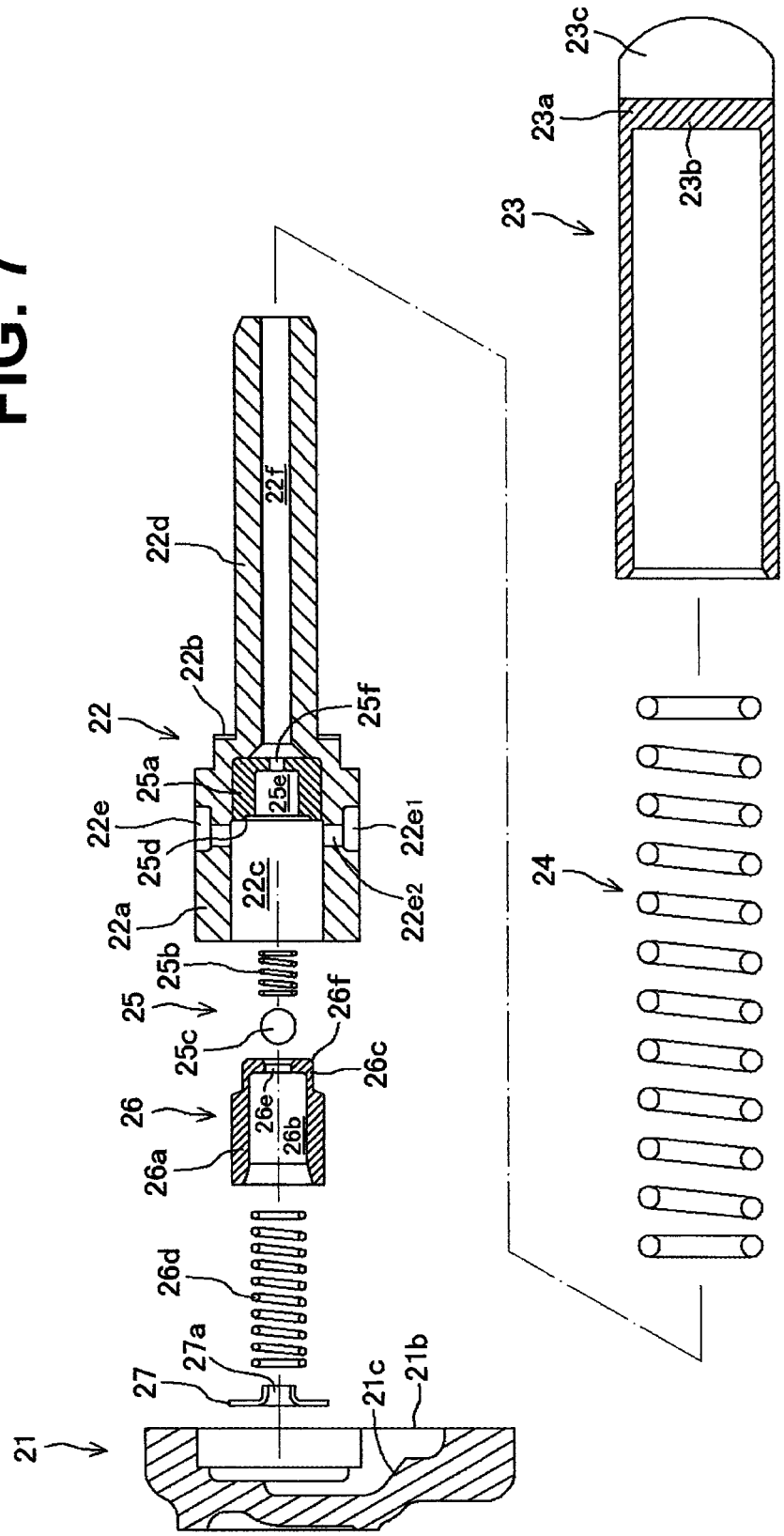
FIG. 7 is an exploded longitudinal sectional view of a check valve and a relief valve in the hydraulic tensioner.

A base end portion 22a of a valve holder 22 shown in FIG. 7 is fixedly fitted in the rear portion of the plunger accommodating hole 20a of the tensioner body 20 as shown in FIGS. 4 to 6. As shown in FIG. 5, a plunger 23 is slidably fitted in the plunger accommodating hole 20a of the tensioner body 20. A high oil pressure chamber 31 is defined in the plunger 23, and a coil spring 24 as biasing means is provided in the plunger accommodating hole 20a and the high oil pressure chamber 31 so that the opposite ends of the coil spring 24 abuts against the shoulder front end surface 22b of the base end portion 22a of the valve holder 22 and the inner surface 23b of the front end portion 23a of the plunger 23. The plunger 23 is normally biased by the coil spring 24 so as to project frontward from the tensioner mounting portion 6a of the cylinder head 6 as shown in FIG. 5. Further, a contact portion 23c adapted to come into contact with the tensioner slipper 15 is fixedly mounted on the front end portion 23a of the plunger 23.

The base end portion 22a of the valve holder 22 is formed with a valve accommodating hole 22c (see FIG. 7), and a valve guide 25a of a check valve 25 is fixedly fitted in the front portion of the valve accommodating hole 22c. A check valve coil spring 25b and a spherical valve element 25c are fitted in the valve guide 25a from the rear end thereof.

A valve element 26a of a relief valve 26 is slidably fitted in the valve accommodating hole 22c of the valve holder 22. A valve chamber 26b is formed in the valve element 26a. A relief valve seat 27 is provided in the oil storing chamber 28 (see FIGS. 4 and 5) so as to be disposed adjacent to the cap 21. A relief valve coil spring 26d is provided in the valve chamber 26b so that the opposite ends of the relief valve coil spring 26d abut against the relief valve seat 27 and the front end portion 26c of the valve element 26a of the relief valve 26. The oil storing chamber 28 is in communication with the high oil pressure chamber 31 through an opening 27a of the relief valve seat 27, the relief valve 26, and the check valve 25.

A pressure holding valve 29 will now be described.

As shown in FIG. 3, a pressure holding valve accommodating hole 20f is formed in the tensioner body 20 at a position on the right lower side of the plunger accommodating hole 20a so as to extend parallel to the plunger accommodating hole 20a (see FIGS. 4 and 5). The rear end of the pressure holding valve accommodating hole 20f opens to the oil storing chamber 28 surrounded by the endless packing 20e.

Figure 8:
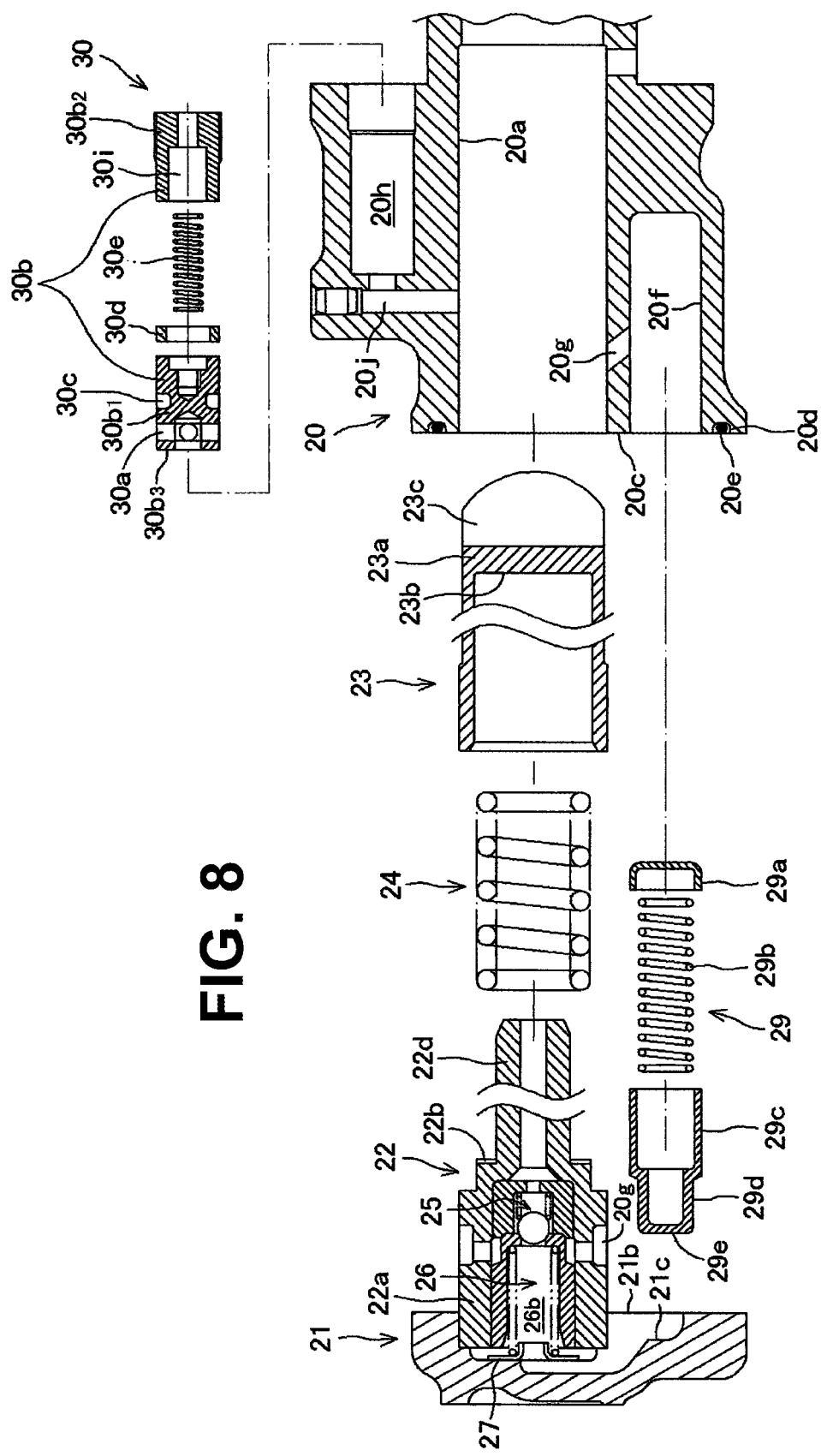
FIG. 8 is an exploded longitudinal sectional view of the air bleeding valve and a pressure holding valve in the hydraulic tensioner in the condition where the check valve and the relief valve are mounted in a valve holder and the air bleeding valve is mounted to the tensioner body.

Prior to mounting the cap 21 to the tensioner body 20, a spring seat 29a, a closing coil spring 29b, and a valve element 29c constituting the pressure holding valve 29 are fitted in this order into the pressure holding valve accommodating hole 20f of the tensioner body 20 from its rear opening as shown in FIG. 8. The rear portion of the valve element 29c is formed as a small-diameter cylindrical portion 29d. As shown in FIG. 4, the valve element 29c is normally biased rearward by the closing coil spring 29b, so that the rear end surface 29e of the small-diameter cylindrical portion 29d of the valve element 29c abuts against the front end surface 21b of the cap 21. In this condition, a communication port 20g of the tensioner body 20 communicating with a relief valve port 22e of the valve holder 22 is closed by the valve element 29c.

As shown in FIG. 7, the relief valve port 22e formed in the valve holder 22 is composed of a circumferential groove 22e1 formed on the outer circumferential surface of the base end portion 22a and a plurality of radial holes 22e2 formed at circumferentially equal intervals so as to extend radially from the bottom of the circumferential groove 22e1 toward the center of the valve accommodating hole 22c.

The air bleeding valve 30 will now be described.

As shown in FIG. 3, an air bleeding valve accommodating hole 20h is formed in the tensioner body 20 at a position on the left upper side of the plunger accommodating hole 20a so as to extend parallel to the plunger accommodating hole 20a. The air bleeding valve accommodating hole 20h has a circular cross section. The upper end of the air bleeding valve accommodating hole 20h is higher in level than the plunger accommodating hole 20a and the pressure holding valve accommodating hole 20f. Accordingly, air in the plunger 23 and the pressure holding valve 29 is smoothly removed through the air bleeding valve accommodating hole 20h. As shown in FIG. 5, the rear portion of the air bleeding valve accommodating hole 20h is in communication with the high oil pressure chamber 31 through an air bleeding passage 20j.

As shown in FIG. 8, the air bleeding valve 30 has an air bleeding valve body 30b. The air bleeding valve body 30b is composed of an upstream valve body $30b_1$ and a downstream valve body $30b_2$. The upstream valve body $30b_2$, a coil spring 30e, and the downstream valve body $30b_2$ are fitted in this order into the air bleeding valve accommodating hole 20h from its front opening. The downstream valve body 30b$_2$ is threadedly engaged with the air bleeding valve accommodating hole 20h. A pressure change in the high oil pressure chamber 31 is transmitted through the air bleeding passage 20j to the air bleeding valve accommodating hole 20h, so that the upstream valve body 30b$_1$ is slightly moved in the axial direction.

Figure 14:
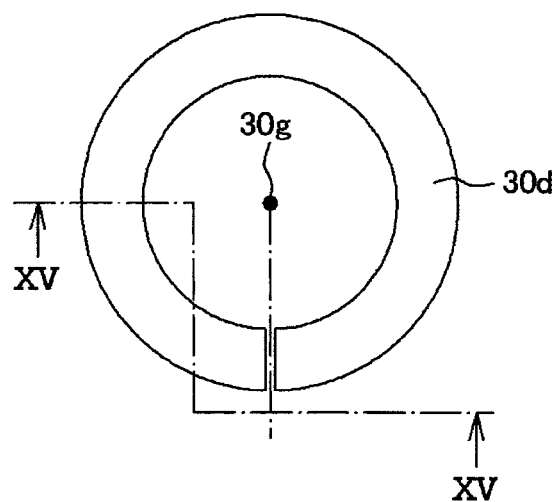
FIG. 14 is a plan view showing an embodiment of an annular valve element having a flat cut portion and constituting the air bleeding valve according to the illustrative embodiment of the present invention.
Figure 15:
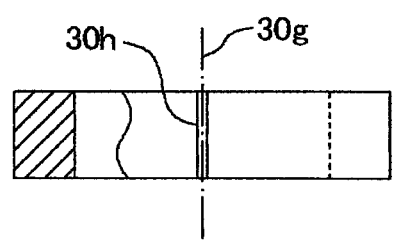
FIG. 15 is a cross section taken along the line XV-XV in FIG. 14.

The outer circumference of the upstream valve body 30b$_1$ is formed with a circumferential groove 30c having a rectangular (or square) cross section. An annular valve element 30d is loosely fitted in the circumferential groove 30c. That is, the annular valve element 30d has a width (axial dimension) slightly smaller than the width of the circumferential groove 30c and a height (radial dimension) slightly smaller than the depth of the circumferential groove 30c. As shown in FIGS. 14 and 15, the annular valve element 30d is cut along the axis 30g to form a flat cut portion (slit) 30h extending in the axial direction, so that the inner diameter of the annular valve element 30d becomes greater than or equal to the diameter of the circumferential groove 30c. Accordingly, the annular valve element 30d is elastically deformed to be fitted into the circumferential groove 30c.

The annular valve element 30d is formed of metal in this illustrative embodiment. Alternatively, the annular valve element 30d may be formed of relatively hard synthetic resin. In any case, the edge formed between the circumferential surface and each end surface of the annular valve element 30d is formed as a sharp edge.

Figure 11:
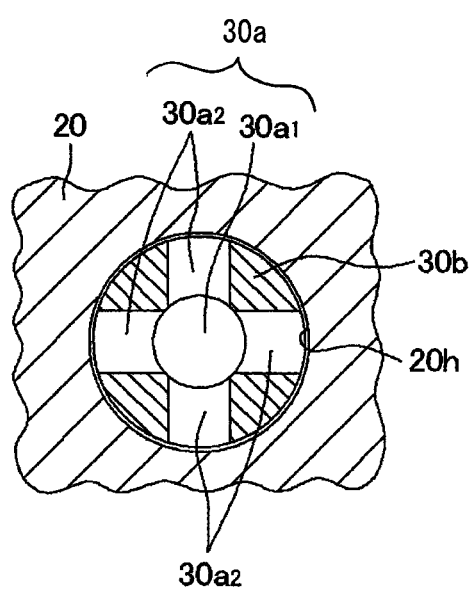
FIG. 11 is a cross section taken along the line XI-XI in FIG. 9.

The upstream valve body 30b$_1$ is formed with an air bleeding passage 30a at a rear portion on the upstream side of the annular valve element 30d. As shown in FIG. 11, the air bleeding passage 30a is composed of a central hole 30a$_1$ extending in the axial direction frontward from the center of the rear end surface 30b$_3$ of the upstream valve body 30b$_1$ (see FIG. 9) and four radial holes 30a$_2$ extending in the radial direction from the front end of the central hole 30a$_1$ and equally spaced in the circumferential direction.

The downstream valve body 30b$_2$ is also formed with an air bleeding hole 30i centrally extending in the axial direction. Accordingly, when a pressure change is transmitted through the air bleeding passage 20j to the upstream valve body 30b$_1$, the upstream valve body 30b$_1$ is axially reciprocated by the biasing force of the coil spring 30e, so that foreign matter contained in the oil and sticking to the inner surface of the air bleeding valve accommodating hole 20h can be scraped off by the sharp edge formed between the circumferential surface and each end surface of the annular valve element 30d.

An oil supply system will now be described.

As shown in FIGS. 3 and 6, the lower portion of the oil storing chamber 28 defined by the recess 21c of the cap 21 and the rear end surface 20c of the tensioner body 20 is connected through a tensioner oil passage 32 to a cylinder head oil passage 33. The tensioner oil passage 32 extends in the tensioner body 20 from the rear portion toward the front portion so as to be inclined downward. The cylinder head oil passage 33 is formed in the tensioner mounting portion 6a of the cylinder head 6. As shown in FIG. 1, the cylinder head oil passage 33 is connected through an oil passage (not shown) formed in the cylinder block 5 and an oil passage 34 formed in the crankcase 4 to an oil filter 35. The oil filter 35 is connected through an oil passage 36 to a discharge port of an oil pump 37. When the oil pump 37 is operated by the operation of the engine 3, the oil stored in the bottom portion of the crankcase 4 is pumped up through a strainer 38 to the oil pump 37. The oil discharged from the oil pump 37 is supplied through the oil passage 36, the oil filter 37, the oil passage 34, the cylinder head oil passage 33, and the tensioner oil passage 32 to the oil storing chamber 28.

As shown in FIG. 6, an oil supply passage is formed by the tensioner oil passage 32 connected to the cylinder head oil passage 33 of the cylinder head 6, the oil storing chamber 28, the valve chamber 26b of the relief valve 26, and a valve hole 26e formed through the front end portion 26c of the valve element 26a of the relief valve 26.

In the illustrative embodiment described above with reference to FIGS. 1 to 15 according to the first through fifth aspects of the present invention, the upstream valve body 30b$_1$ fitted in the air bleeding valve accommodating hole 20h of the tensioner body 20 is axially slidable relative to the downstream valve body 30b$_2$ and reciprocated by the biasing force of the coil spring 30e. A mixture of oil and air is introduced from the high oil pressure chamber 31 through the air bleeding passage 20j to the gap between the inner surface of the air bleeding valve accommodating hole 20h and the outer surface of the upstream valve body 30b$_1$.

Figure 9:
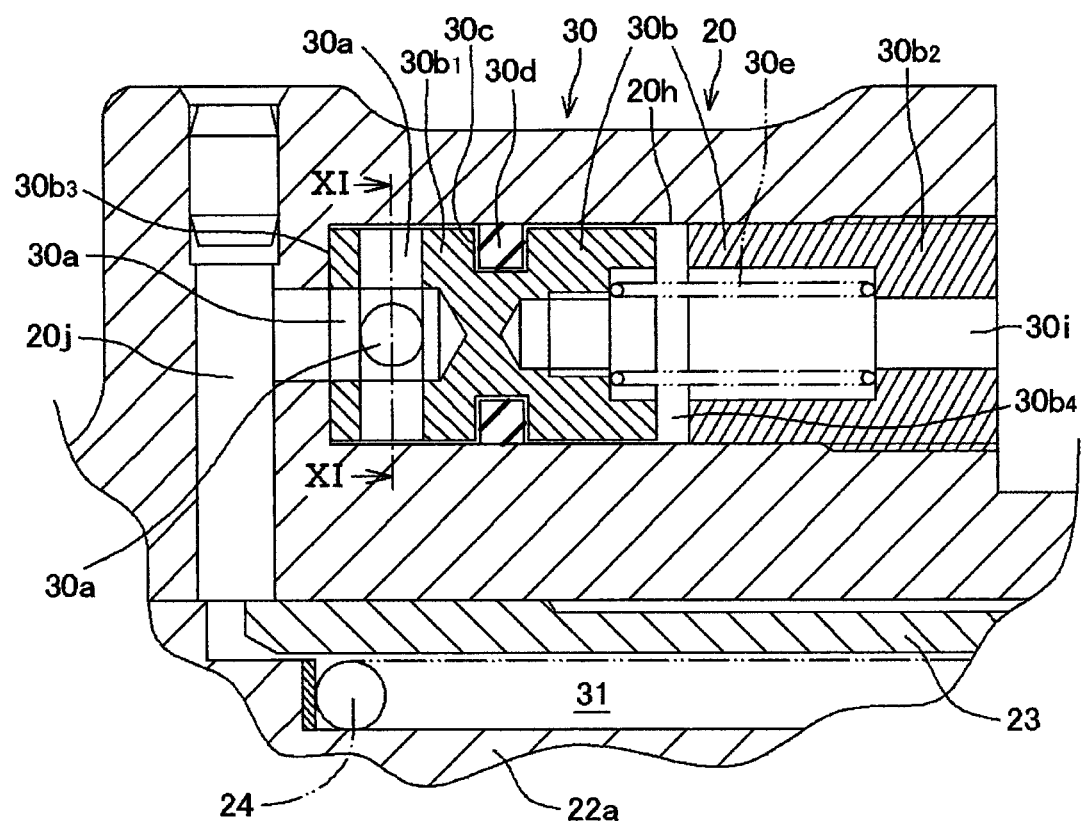
FIG. 9 is an enlarged longitudinal sectional view of the air bleeding valve of the hydraulic tensioner.
Figure 10:
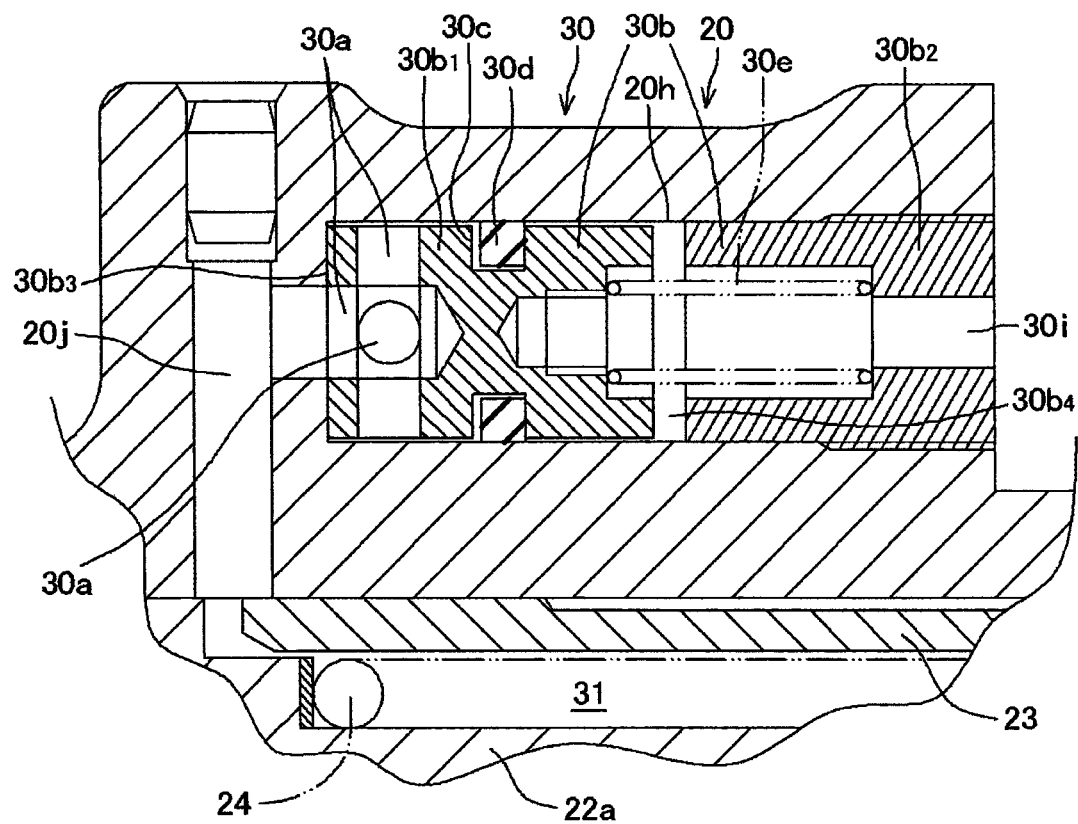
FIG. 10 is a longitudinal sectional view similar to FIG. 9, showing a condition where air is passed through the air bleeding valve.
Figure 12:
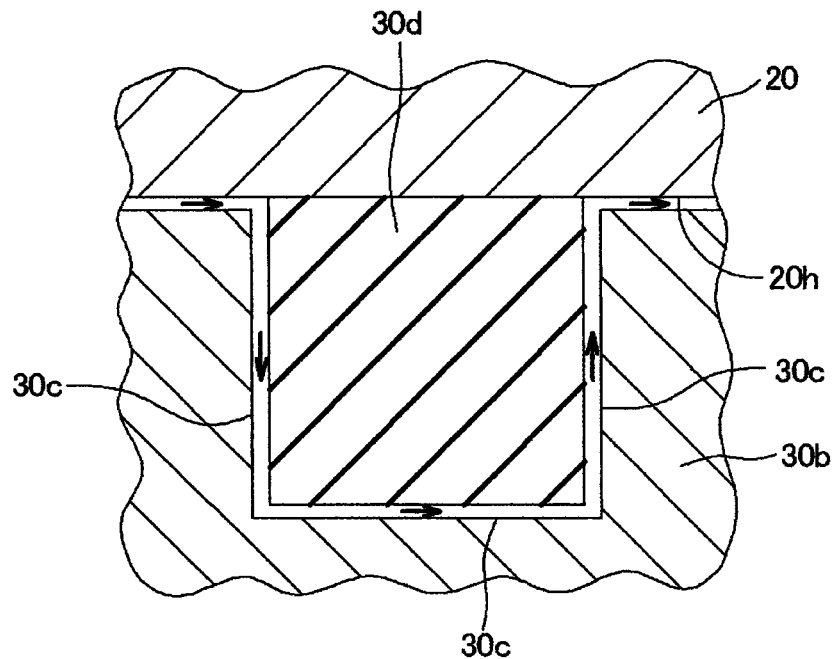
FIG. 12 is an enlarged view of an essential part in FIG. 9.

Initially, the air in this mixture is passed, because of its low viscosity, through the gap between the inner surface (the side surfaces and bottom surface) of the circumferential groove 30c and the side surface (the end surfaces and inner circumferential surface) of the annular valve element 30d as shown in FIG. 12 and next passed through an air bleeding passage (spacing) 30b$_4$ formed between the upstream valve body 30b$_1$ and the downstream valve body 30b$_2$ to the air bleeding hole 30i as shown in FIG. 9. The air is finally removed from the air bleeding hole 30i through an air bleeding hole 6c formed in the cylinder head 6 as shown in FIGS. 4 and 5.

Figure 13:
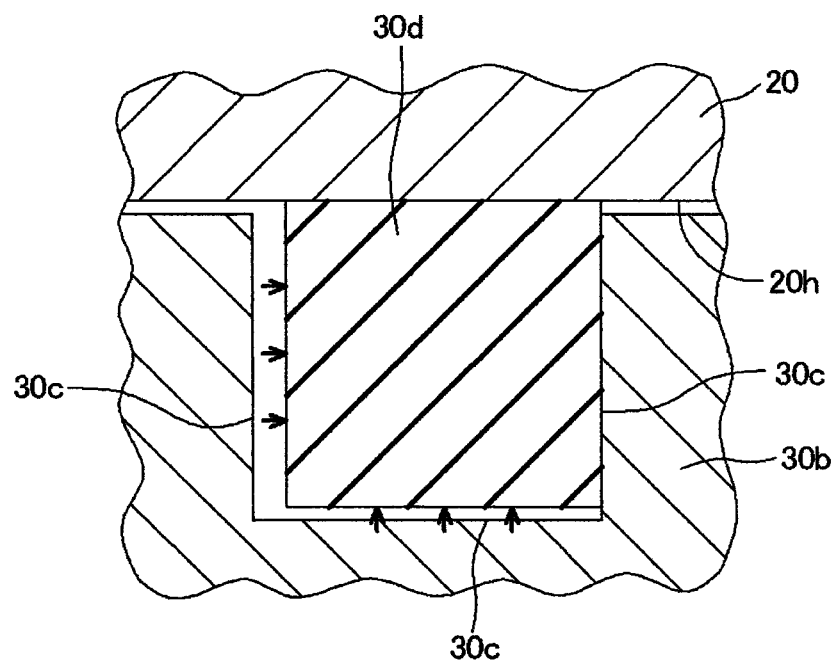
FIG. 13 is an enlarged view of an essential part in FIG. 10.

Thereafter, the oil higher in viscosity than the air is introduced into the gap between the upstream inner surface of the circumferential groove 30c and the upstream end surface of the annular valve element 30d. As a result, the annular valve element 30d is pushed toward the downstream side, i.e., toward the front side by the pressure of the oil having a high viscosity. Accordingly, the downstream end surface of the annular valve element 30d comes into close contact with the downstream inner surface of the circumferential groove 30c as shown in FIG. 13, thereby stopping the flow of the air and the oil. Further, owing to the pressure of the oil introduced into the gap between the bottom surface of the circumferential groove 30c and the inner circumferential surface of the annular valve element 30d, the annular valve element 30d is expanded radially to block the discharge of the oil to the air bleeding hole 30i.

When the oil pressure in the high oil pressure chamber 31 is reduced, the upstream valve body 30b$_1$ is moved rearward by the biasing force of the coil spring 30e, so that only the air in the air-oil mixture introduced into the air bleeding valve accommodating hole 20h is selectively removed from the air bleeding hole 30i.

Such an operation is repeated, only the air in the air-oil mixture in the hydraulic tensioner 0 is selectively removed. As a result, even when the plunger 23 of the hydraulic tensioner 0 receives a rearward depression force from the tensioner slipper 15, the plunger 23 is not remarkably depressed to thereby hold the function of the hydraulic tensioner 0. In summarizing the above description of the repeated operation: pressure change in the high pressure oil chamber 31, which receives pressurized fluid from the oil pump 37, moves the upstream valve body 30b$_1$ slightly in the axial direction as well as the annular valve element 30d, and when the pressure in the high pressure oil chamber 31 is reduced the upstream valve body 30b$_1$ and the annular valve element 30d are moved slightly in the opposite direction by the force of spring 30e, and the process is repeated with further pressure changes in the high pressure oil chamber 31.

The upstream valve body 30b₁ is allowed to slightly slide on the inner circumferential surface of the air bleeding valve accommodating hole 20h. Accordingly, foreign matter sticking to the inner circumferential surface of the air bleeding valve accommodating hole 20h can be scraped off by the sharp edge formed between the outer circumferential surface and each end surface of the annular valve element 30d, thereby suppressing the leakage of oil.

The upstream valve body 30b₁ is formed with the central hole 30a₁ and the plural radial holes 30a₂ equally spaced in the circumferential direction. Accordingly, the mixture of air and oil can be uniformly dispersed to the entire circumference of the gap formed between the inner circumferential surface of the air bleeding valve accommodating hole 20h and the outer circumferential surface of the annular valve element 30d, thereby efficiently performing air bleeding.

The annular valve element 30d having a rectangular cross section is fitted in the circumferential groove 30c having a rectangular cross section. Accordingly, the annular valve element 30d can be stably held in the circumferential groove 30c, thereby suppressing the vibrations of the valve element 30d.

The annular valve element 30d has the flat cut portion 30h and is formed of an elastically deformable material. Accordingly, the annular valve element 30d can be easily fitted into the circumferential groove 30c of the air bleeding valve body 30b without damage. Further, the outer circumferential surface of the annular valve element 30d can be brought into close contact with the inner circumferential surface of the air bleeding valve accommodating hole 20h by the elasticity of the annular valve element 30d, thereby further suppressing the removal of oil and ensuring the sealability.

Further, the mixture of air and oil possibly passed through the circumferential groove 30c of the air bleeding valve body 30b flows through a downstream passage having a large channel resistance, so that the leakage of oil can be reduced.

The channel resistance of the air bleeding hole 30i in the downstream valve body 30b₂ can be increased by the coil spring 30e, thereby further suppressing the leakage of oil.

The upper end of the air bleeding valve accommodating hole 20h is higher in level than the plunger accommodating hole 20a and the pressure holding valve accommodating hole 20f, so that air in the plunger 23 and the pressure holding valve 29 can be smoothly removed through the air bleeding valve accommodating hole 20h.

Figure 16:
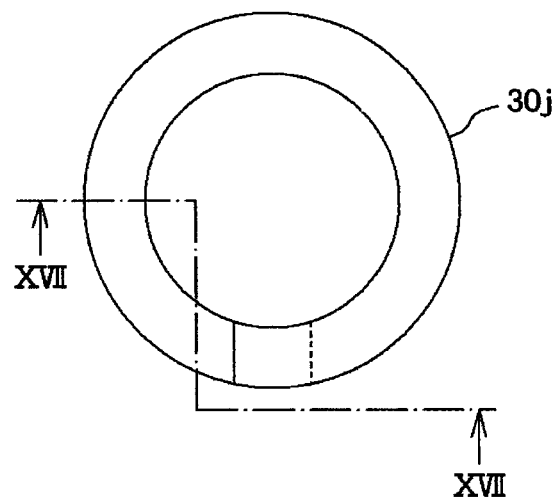
FIG. 16 is a plan view of an annular valve element according to the sixth aspect of the air bleeding valve of the present invention.
Figure 17:
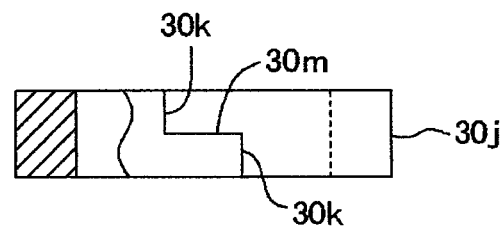
FIG. 17 is a cross section taken along the line XVII-XVII in FIG. 16.

FIGS. 16 and 17 show an annular valve element 30j according to a second illustrative embodiment of the present invention in addition to the annular valve element 30d according to the illustrative embodiment shown in FIGS. 1 to 15.

As shown in FIGS. 16 and 17, the annular valve element 30j is formed with a stepped cut portion. The stepped cut portion is composed of a pair of first cut portions 30k extending axially from the opposite end surfaces of the annular valve element 30j at circumferentially spaced positions to the axially middle position between the opposite end surfaces of the annular valve element 30j and a second cut portion 30m circumferentially extending parallel to the opposite end surfaces of the annular valve element 30j so as to connect the axially inner ends of the first cut portions 30k.

The annular valve element 30j according to the second illustrative embodiment shown in FIGS. 16 and 17 can exhibit an effect similar to that of the annular valve element 30d according to the illustrative embodiment shown in FIGS. 1 to 15. In addition, even when the diameter of the annular valve element 30j is increased so that the outer circumferential surface of the annular valve element 30j comes into close contact with the inner circumferential surface of the air bleeding valve accommodating hole 20h, the facing cut surfaces forming the second cut portion 30m are kept in close contact with each other, thereby eliminating the leakage of oil.

Figure 18:
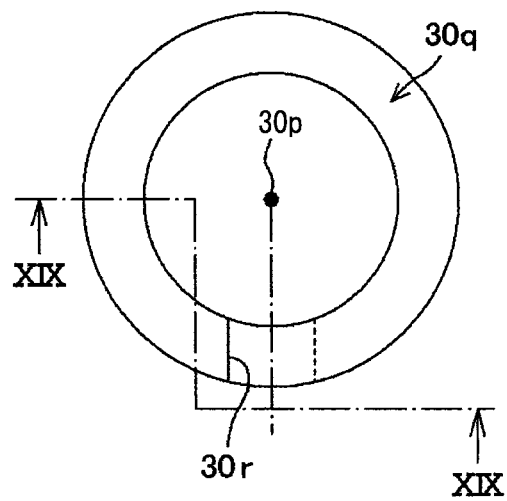
FIG. 18 is a plan view of an annular valve element according to the seventh aspect of the air bleeding valve of the present invention.
Figure 19:
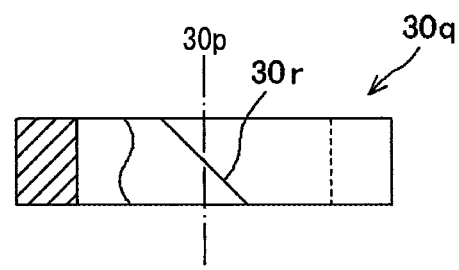
FIG. 19 is a cross section taken along the line XIX-XIX in FIG. 18.

Further, an annular valve element 30q can be configured as shown in FIGS. 18 and 19.

As shown in FIGS. 18 and 19, according to a third illustrative embodiment, the annular valve element 30q is formed with an inclined cut surface 30r extending from one end surface to the other end surface of the annular valve element 30q so as to be inclined with respect to the axis 30p of the annular valve element 30q. The annular valve element 30q can also exhibit an effect similar to that of the annular valve element 30j shown in FIGS. 16 and 17. That is, even when the diameter of the annular valve element 30q is increased, the facing cut surfaces forming the inclined cut surface 30r are kept in close contact with each other.

Figure 20:
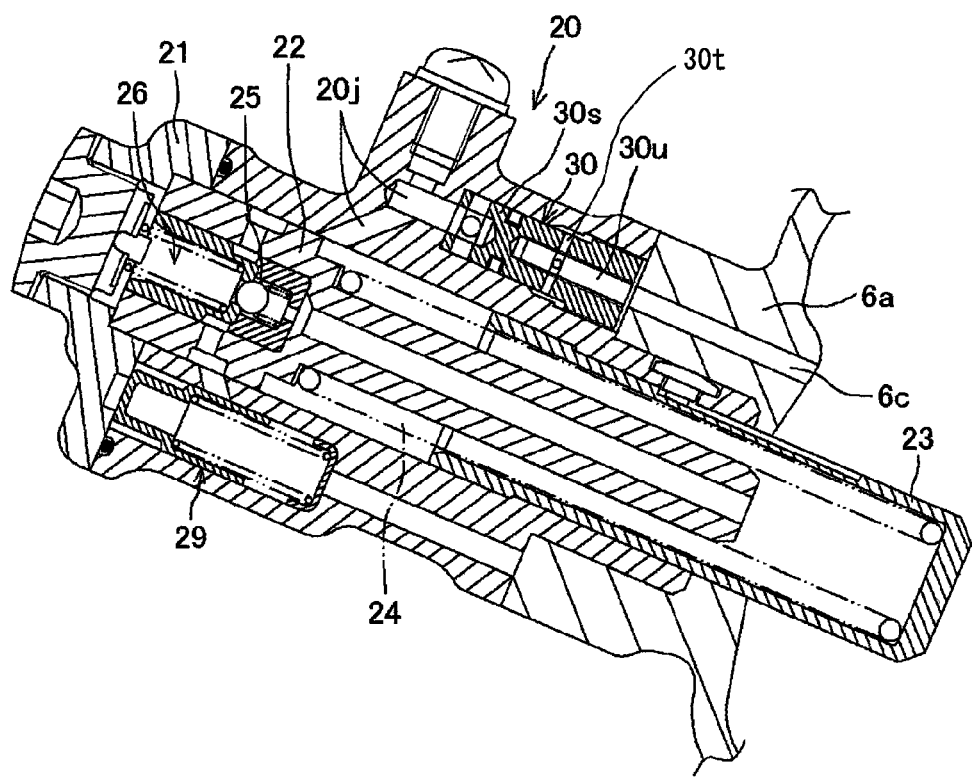
FIG. 20 is a longitudinal sectional view of an air bleeding valve according to the fourth aspect of the present invention.
Figure 21:
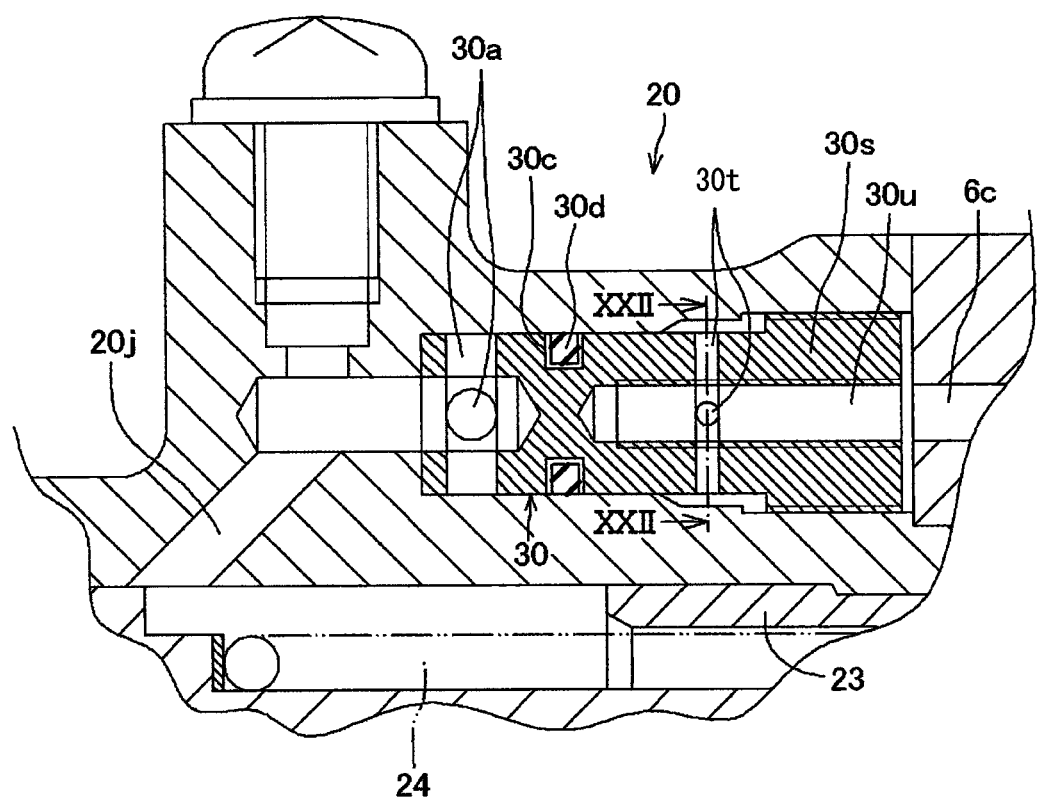
FIG. 21 is an enlarged sectional view of the air bleeding valve shown in FIG. 20.
Figure 22:
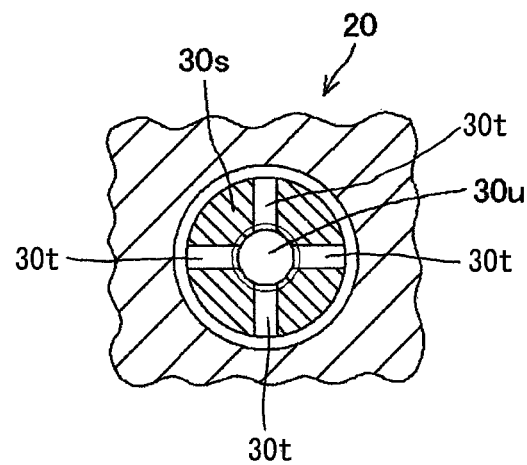
FIG. 22 is a cross section taken along the line XXII-XXII in FIG. 21.

In the illustrative embodiment shown in FIGS. 1 to 15, the air bleeding valve body 30b is composed of the upstream valve body 30b₁ and the downstream valve body 30b₂ separated from each other, and the coil spring 30e is interposed between the upstream valve body 30b₁ and the downstream valve body 30b₂. In contrast thereto, an air bleeding valve body 30s according to a fourth illustrative embodiment shown in FIGS. 20 to 22 is an integral member fixedly fitted in the air bleeding valve accommodating hole 20h. Four radial holes 30t as an air bleeding passage and a central hole 30u as an air bleeding hole extending in the axial direction and connected to the four radial holes 30t are formed on the downstream side of the air bleeding valve body 30s.

In the fourth illustrative embodiment shown in FIGS. 20 to 22, the hydraulic tensioner is largely inclined downward on the front side, and the front end of the air bleeding hole 30u is connected to the air bleeding hole 6c formed in the tensioner mounting portion 6a, so that the air separated from the oil in the air bleeding body 30s is discharged into the cylinder head.

According to the fourth illustrative embodiment shown in FIGS. 20 to 22, the coil spring 30e is not required, so that the number of parts can be reduced and the structure of the air bleeding valve can be simplified, thereby attaining a cost reduction.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A hydraulic tensioner for an engine having a cylinder head, said hydraulic tensioner comprising
   a tensioner body secured to a portion of the cylinder head, and having an air bleeding valve accommodating hole formed therein; and
   an air bleeding valve comprising
      an air bleeding valve body fitted in the air bleeding valve accommodating hole;
      a circumferential groove having a rectangular cross section formed on an outer circumferential surface of said air bleeding valve body; and
      an annular valve element having a rectangular cross section fitted in said circumferential groove; said annular valve element having a cut portion formed thereon for allowing elastic deformation of said annular valve element in a radial direction;

wherein:
said air bleeding valve body comprises an upstream valve body and a downstream valve body; said upstream valve body having a central hole and a plurality of radial holes formed therein;
said upstream valve body is slidably inserted in said air bleeding valve accommodating hole of said hydraulic tensioner;
said downstream valve body is fixedly mounted in said air bleeding valve accommodating hole such that a spacing is defined between respective end portions of said upstream valve body and said downstream valve body; and
a spring is interposed between said upstream valve body and said downstream valve body for biasing said upstream valve body toward the upstream side.

2. A hydraulic tensioner according to claim 1, wherein said cut portion comprises a pair of first cut portions extending axially from the opposite end surfaces of said annular valve element at circumferentially spaced positions to an axially middle position between the opposite end surfaces of said annular valve element and a second cut portion extending circumferentially parallel to the opposite end surfaces of said annular valve element so as to connect the axially inner ends of said first cut portions.

3. A hydraulic tensioner according to claim 1, wherein said cut portion comprises an inclined cut surface extending from one end surface to the other end surface of said annular valve element so as to be inclined with respect to the axis of said annular valve element; and
wherein said air bleeding valve body has an air bleeding hole and an air bleeding passage formed therein; wherein said air bleeding hole is located downstream of said circumferential groove and extends axially so as to communicate with the outside of a tensioner body of said hydraulic tensioner, and said an air bleeding passage extends radially from the outer circumference of said air bleeding valve body to said air bleeding hole.

4. An air bleeding valve for a hydraulic tensioner, said hydraulic tensioner having an air bleeding valve accommodating hole formed therein; said air bleeding valve comprising an annular valve element for removing air from oil contained in a hydraulic circuit of the hydraulic tensioner and suppressing removal of said oil, wherein
an air bleeding valve body is fitted in the air bleeding valve accommodating hole of said hydraulic tensioner;
a circumferential groove having a rectangular cross section is formed on an outer circumferential surface of said air bleeding valve body; and
said annular valve element having a rectangular cross section is fitted in said circumferential groove so as to be movable in an axial direction parallel to an axis of said annular valve element and displaceable in a radial direction toward and away from the axis of said annular valve element.

5. The air bleeding valve for the hydraulic tensioner according to claim 4, wherein when an oil pressure is applied to said annular valve element, one end surface of said annular valve element comes into close contact with one side surface of said circumferential groove having the rectangular cross section.

6. The air bleeding valve for the hydraulic tensioner according to claim 4, wherein said annular valve element is formed with a cut portion for allowing elastic deformation of said annular valve element in the radial direction.

7. The air bleeding valve for the hydraulic tensioner according to claim 6, wherein said cut portion of said annular valve element comprises a pair of first cut portions extending axially from the opposite end surfaces of said annular valve element at circumferentially spaced positions to an axially middle position between the opposite end surfaces of said annular valve element, and a second cut portion extending circumferentially parallel to the opposite end surfaces of said annular valve element so as to connect the axially inner ends of said first cut portions.

8. The air bleeding valve for the hydraulic tensioner according to claim 6, wherein said cut portion of said annular valve element comprises an inclined cut surface extending from one end surface to the other end surface of said annular valve element so as to be inclined with respect to the axis of said annular valve element.

9. The air bleeding valve for the hydraulic tensioner according to claim 4, wherein said air bleeding valve body is slidably fitted in said air bleeding valve accommodating hole of said hydraulic tensioner.

10. The air bleeding valve for the hydraulic tensioner according to claim 9 further comprising a spring, wherein:
said air bleeding valve body comprises an upstream valve body and a downstream valve body;
said upstream valve body is slidably inserted in said air bleeding valve accommodating hole of said hydraulic tensioner;
said downstream valve body is fixedly mounted in said air bleeding valve accommodating hole such that a spacing is defined between a downstream end surface of said upstream valve body and an upstream end surface of said downstream valve body; and
said spring is interposed between said upstream valve body and said downstream valve body for biasing said upstream valve body toward the upstream side.

11. The air bleeding valve for the hydraulic tensioner according to claim 10, wherein said downstream valve body has an air bleeding hole formed therein; and at least a portion of said spring is fitted in the air bleeding hole; and said spring comprises a coil spring.

12. The air bleeding valve for the hydraulic tensioner according to claim 4, wherein said air bleeding valve body is fixedly fitted in said air bleeding valve accommodating hole of said hydraulic tensioner.

13. The air bleeding valve for the hydraulic tensioner according to claim 4, wherein said air bleeding valve body is formed with a central hole located upstream of said circumferential groove and extending axially from a center of an end surface toward a downstream side and a plurality of radial holes extending radially from a downstream end of said central hole and equally spaced in the circumferential direction.

14. The air bleeding valve for the hydraulic tensioner according to claim 4, wherein said air bleeding valve body has an air bleeding hole and an air bleeding passage formed therein; wherein said air bleeding hole is located downstream of said circumferential groove and extends axially so as to communicate with an outside of a tensioner body of said hydraulic tensioner, and said air bleeding passage extends radially from an outer circumference of said air bleeding valve body to said air bleeding hole.

15. The air bleeding valve for the hydraulic tensioner according to claim 4, wherein:
said hydraulic tensioner has a plunger accommodating hole for accommodating a plunger and a pressure holding valve accommodating hole for accommodating a pressure holding valve formed therein; and
when said hydraulic tensioner is mounted on an internal combustion engine, an upper end of said air bleeding valve accommodating hole is higher in level than said plunger accommodating hole and said pressure holding valve.

16. An air bleeding valve for a hydraulic tensioner, said hydraulic tensioner having an air bleeding valve accommodating hole formed therein;

said air bleeding valve comprising an annular valve element for removing air from oil contained in a hydraulic circuit of the hydraulic tensioner and suppressing removal of said oil;

an air bleeding valve body slidably fitted in the air bleeding valve accommodating hole of said hydraulic tensioner; and a circumferential groove having a rectangular cross section formed on an outer circumferential surface of said air bleeding valve body;

wherein:

said annular valve element has a rectangular cross section fitted in said circumferential groove;

a width and a height of said annular valve element are less than a width and a height of said circumferential groove, respectively;

said annular valve element has a cut portion formed therein for allowing elastic deformation of said annular valve element in a radial direction.

17. An air bleeding valve for the hydraulic tensioner according to claim 16, wherein when an oil pressure is applied to said annular valve element, one end surface of said annular valve element comes into close contact with one side surface of said circumferential groove having said rectangular cross section.

18. An air bleeding valve for the hydraulic tensioner according to claim 16, wherein said cut portion of said annular valve element comprises a pair of first cut portions extending axially from the opposite end surfaces of said annular valve element at circumferentially spaced positions to an axially middle position between the opposite end surfaces of said annular valve element and a second cut portion extending circumferentially parallel to the opposite end surfaces of said annular valve element so as to connect the axially inner ends of said first cut portions.

19. An air bleeding valve for the hydraulic tensioner according to claim 16, wherein said cut portion of said annular valve element comprises an inclined cut surface extending from one end surface to the other end surface of said annular valve element so as to be inclined with respect to the axis of said annular valve element.

20. An air bleeding valve for the hydraulic tensioner according to claim 16, wherein said air bleeding valve body has an air bleeding hole and an air bleeding passage formed therein; wherein said air bleeding hole is located downstream of said circumferential groove and extends axially so as to communicate with the outside of a tensioner body of said hydraulic tensioner, and said an air bleeding passage extends radially from the outer circumference of said air bleeding valve body to said air bleeding hole.

* * * * *